United States Patent Office 2,866,681
Patented Dec. 30, 1958

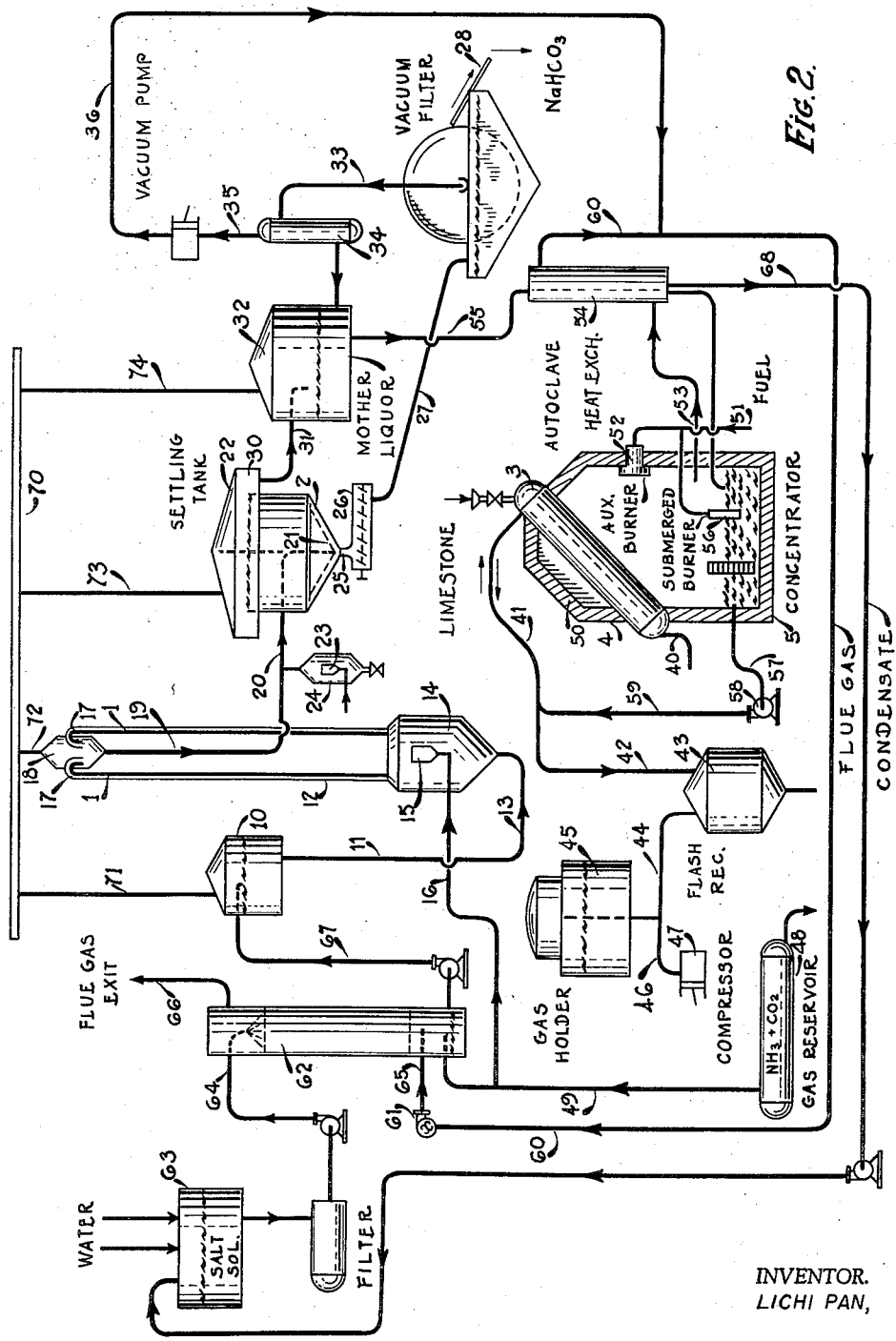

2,866,681

METHOD AND APPARATUS FOR THE PRODUCTION OF SODIUM BICARBONATE

Lichi Pan, Jamaica, N. Y., assignor to Chemical Construction Corporation, New York, N. Y., a corporation of Delaware Application May 9, 1955, Serial No. 507,023

10 Claims. (Cl. 23—64)

This invention relates to an improved method and apparatus for producing sodium bicarbonate by the reaction of ammonia and carbon dioxide with an aqueous sodium chloride solution. The invention is directed particularly to an improved reaction method for conducting the carbonation and ammoniation of the brine solution, to an improved procedure for separating solid sodium bicarbonate from the resulting suspension, and to an improved method for recovering ammonia from the resulting ammonium chloride solution for return to the process.

In producing sodium bicarbonate and soda ash by the Solvay process it is now the practice to introduce carbon dioxide into ammoniated brine solution in a carbonating tower. After a few months operation such towers often become clogged by an accumulation of sodium bicarbonate crystals, and must be shut down for cleaning. The ammonium chloride solution formed by the carbonation reaction is ordinarily causticized with lime in an ammonia still in order to liberate ammonia which is returned to the process, and in normal operation such ammonia stills also require periodic cleaning. Spare towers and stills are therefore generally provided so that one of them may be cleaned while the process continues with the rest of the equipment. This requires a large investment for apparatus which is idle part of the time, or not operated at full capacity, and therefore contributes materially to the overhead cost of the process. The gradual clogging up of the reaction towers and ammonia stills also causes uneven operations, and the towers in parallel will have different back pressures which make the process hard to control. For all of these reasons, there is considerable room for substantial improvements in the Solvay process as it is now practiced on a commercial scale.

It is a principal object of the present invention to substitute for the present carbonating towers a reactor system wherein streams of aqueous sodium chloride solution are caused to move upwardly at a rate sufficiently rapid to prevent the deposition of solids, ammonia and carbon dioxide being introduced therein to bring about the formation of solid sodium bicarbonate. A further object of the invention is the provision of a thickener or settling tank wherein the solid sodium bicarbonate separates from the supernatant ammonium chloride solution in the form of a thickened sludge which can readily be drawn off and filtered. Another object, which employs one of the principal novel features of the invention, is the provision of a new method for recovering ammonia from the ammonium chloride solution by reacting it with calcium carbonate to form calcium chloride and ammonia and carbon dioxide gases which are returned to the process. A still further object of the invention is the provision of a novel process and apparatus for heating the autoclave wherein the reaction between ammonium chloride and calcium carbonate is carried out; these and other objects of the invention will become apparent from the following description of a preferred embodiment thereof when taken with the attached drawings and the specific examples which follow.

Figures 1 and 2 are flow diagrams showing the combinations and sub-combinations of apparatus elements used in practicing the invention both in its general form and in a preferred form that will hereinafter be described in detail; the drawing also constitutes a flow sheet illustrating the process features of the invention. In general, the apparatus illustrated consists essentially of a reactor for reacting ammonia and carbon dioxide with aqueous sodium chloride solution, which is indicated by reference numeral 1; a thickener or settling tank for separating a sodium bicarbonate pulp from the reaction products, indicated by reference numeral 2; an autoclave 3 for reacting supernatant ammonium chloride solution from the thickener 2 with calcium carbonate, and a furnace 4 for providing heat for the autoclave 3 and, in a preferred embodiment of the invention, a concentrator 5 for concentrating the ammonium chloride solution before it is introduced into the autoclave.

Taking up first those embodiments of the invention in which no carbon dioxide is recovered from the stack gases from the furnace 4, a solution of sodium chloride in a head tank 10 is passed downwardly through a standpipe 11 which is of a sufficient height to provide a suitable hydrostatic pressure for the absorption of carbon dioxide in the brine solution. The base of the standpipe 11 communicates with the lower ends of a plurality of vertical reaction tubes 12 by means of one or more connecting pipes 13, it being understood that all of the vertical tubes 12 are connected at their lower ends by a common horizontal header or liquid distributing pipe that is not shown. Each reaction tube 12 is preferably provided adjacent its lower end with an enlarged portion 14 containing a diffuser 15; the diffusers are preferably made of porous stainless steel plates such as those made by powder metallurgy technique. Carbon dioxide and ammonia are preferably introduced into the brine solution rising in the reaction tubes 12 through these diffusers by means of one or more pipes 16. Throughout the specification reference is made to a plurality of vertical tubes 12. However, in some cases where limited production is desired it is obvious that one vertical tube would be sufficient.

The reaction tubes 12 communicate at their upper ends 17 with a header 18 which connects by pipes 19 and 20 with the interior of the thickener or settling tank 2. It will be seen that, by this arrangement, the carbonation of the ammoniated brine solution is carried out under the hydrostatic head or pressure of the standpipe 11 and in a number of relatively small and rapidly rising streams in the vertical reaction tubes 12. The internal surfaces of these reaction tubes are smooth and contain no baffles or ledges to catch and accumulate solids, as in conventional carbonating towers, and all of the solid sodium bicarbonate formed therein is therefore carried over into the thickener or settling tank 2 and settled out in the presence of mechanism with positive action to remove the solids. This thickener is a vessel of the conventional Dorr type, provided with slowly rotating classifying rakes 21 and with a gas-tight cover 22. In order to maintain a sufficient partial pressure of carbon dioxide in the settling tank to ensure completion of the sodium bicarbonate-forming reaction, additional carbon dioxide from the calcination of the sodium bicarbonate to sodium carbonate may be introduced through a diffuser 23 operating in a suitable chamber 24.

In the thickener 2 the suspension of solid sodium bicarbonate in aqueous ammonium chloride solution from the reaction tubes 12 is thickened and separated into a sodium bicarbonate pulp and a supernatant clarified ammonium chloride solution. The pulp is withdrawn as an underflow from the thickening process through outlet pipe 25 and screw conveyer 26, and may be conducted through a line 27 to a vacuum filter 28 or other suitable means for recovering solid sodium bicarbonate as the final product from the process. The supernatant ammonium chloride solution overflows into a launder 30 and passes through line 31 to a mother liquor storage tank 32. When a vacuum filter is used to recover the solid sodium bicarbonate, the filtrate and wash water may also be passed to the tank 32 by means of filtrate line 33 and separation tank 34, the latter tank preferably being connected to the vacuum line 35. In order to recover dissolved carbon dioxide that may be given off under the reduced pressures employed in filtering, the exhaust line 36 from the vacuum pump is preferably connected with the stack gas system of the furnace 4 that will hereinafter be described.

Some of the difficulties in causticizing the ammonium chloride liquors with lime in the usual practice of the Solvay process have already been mentioned. In the preferred practice of the present invention these difficulties are entirely overcome, and the necessity of calcining limestone to provide the lime and carbon dioxide is also avoided, by the novel procedure of reacting the ammonium chloride solutions with calcium carbonate itself. This reaction can be carried substantially to completion if an autoclave is used to obtain reaction temperatures in excess of about 230° C., and preferably about 240°–275° C. Such temperatures are readily obtained at autoclave pressures on the order of about 500–800 lbs. per square inch gage.

The mother liquor in the tank 32 is essentially a solution of ammonium chloride in water, although it has a small content of sodium and ammonium bicarbonates. This liquor may be subjected to a preliminary concentration or it may be charged directly into the autoclave 3; in either case a quantity of calcium carbonate is also charged sufficient to react with all of the chloride ions present, thereby liberating ammonia and carbon dioxide. The chief reactions which take place in the autoclave are the following:

(1) $2CaCO_3 + 2H_2O$ (under pressure) $\rightarrow$

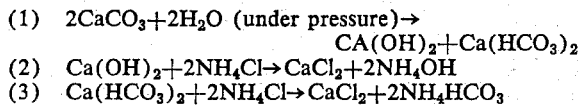

(2) $Ca(OH)_2 + 2NH_4Cl \rightarrow CaCl_2 + 2NH_4OH$
(3) $Ca(HCO_3)_2 + 2NH_4Cl \rightarrow CaCl_2 + 2NH_4HCO_3$ After the autoclaving has been completed to a necessary or desired extent the calcium chloride solution is discharged through line 40. Inasmuch as calcium chloride is a valuable by-product, this solution may be evaporated to dryness and the calcium chloride recovered in solid form. The ammonia and carbon dioxide gases given off by the reaction are removed from the autoclave through line 41, and are preferably so vented from time to time during the reaction in order to maintain an optimum autoclave pressure. These gases pass through line 42 to a flash receiver 43, wherein entrained liquids are separated, and are then passed through line 44 to a gas holder 45. From this gas holder they are withdrawn as needed through line 46 and compressed by a compressor 47 and stored in a gas reservoir 48, from which they are taken through line 49 and returned to pipe 16 for reuse in the process.

While the autoclave 3 may be heated by any suitable means, it is preferably set in the upper part 50 of the furnace 4, the lower portion of which contains a concentrator 5. Carbonaceous fuel such as natural gas supplied through line 51 is burned with air in a burner 52, the products of combustion providing all or a part of the heat needed for autoclave 3, and the stack gases leaving through pipe 53 are preferably passed in indirect heat exchange with ammonium chloride solution in the heat exchanger 54 whereby these gases are partially cooled and the ammonium chloride solution is preheated.

In a preferred embodiment of the invention the ammonium chloride solution from tank 32 is partially concentrated before it is introduced into the autoclave 3. Ordinarily this solution has a solids content of about 20–25%, but a substantial saving in autoclave volume can be obtained by preconcentrating it in the concentrator 5. The extent to which the solution is concentrated will of course be determined by comparing the overhead charges on autoclave volume with the cost of the additional fuel necessary for concentration, but this fuel cost can be partially recovered by utilizing the stack gases from the concentrator as an additional source of carbon dioxide for use in the process. This is accomplished by locating the concentrator 5 in the base of the furnace 4, the dilute ammonium chloride solution from the tank 32 being fed through line 55 and preheated in the heat exchanger 54. Fuel from the line 51 is burned in a burner 56 and the resulting hot gases contact the ammonium chloride solution in the concentrator 5 and evaporate water therefrom. The concentrated ammonium chloride solution is drawn from the concentrator through line 57 and is pumped into the autoclave 3 by means of a pump 58 and discharge line 59. Preferably the solution is concenrated by this means to a solids content of about 40–50%.

The steam and the carbon dioxide gases resulting from the combustion of carbonaceous fuel in the burner 56 are passed through line 53 along with the gases from the burner 52, and the mixed gases are cooled in the heat exchanger 54. They then pass through line 60 and blower 61 to a scrubbing tower 62, which is preferably provided with packing. Aqueous sodium chloride solution from tank 63 is pumped into the top of this tower through pipe 64, and is partially carbonated by countercurrent contact with the carbon dioxide gases entering through line 65. The decarbonated flue gases are sent through an outlet stack 66, while the partially carbonated sodium chloride solution is pumped through line 67 to the head tank 10 for use in the process which has been described. Condensate from the exchanger 54 may be withdrawn through line 68 and passed into the tank 63 to be used in making up the aqueous sodium chloride solution.

When the above-described apparatus is installed on a commercial scale the head tank 10 is located at a sufficient height so that a very substantial hydrostatic pressure head is depeloped by the standpipe 11. Preferably this standpipe is at least 50 feet in height. The reaction tubes 12 are considerably longer than the standpipe 11, a height of about 100 feet being recommended for these tubes, since the gases from the diffusers mixing with the solution reduce the specific gravity of the mixture to below that of the initial solution and cause the mixture to rise in reactor tube 1. It will be understood that practically all of the ammonia and most of the carbon dioxide entering the reaction tubes through the diffusers 15 will be dissolved under the operating pressures used, but a part of the carbon dioxide remains temporarily undissolved and acts as a motive power which lifts the solution to the tops of the tubes. In order to equalize the pressure conditions in the system a manifold 70 is provided having pipes 71, 72, 73 and 74 which connect with the head tank 10, the header 18, the thickener 2 and the mother liquor tank 32, respectively. By this means any desired carbon dioxide pressure can be maintained in the sodium bicarbonate-producing portion of the system without danger of vapor lock.

From the foregoing description of a preferred embodiment it will be seen that the present invention provides a reactor for reacting ammonia and carbon dioxide with aqueous sodium chloride solution for the production of solid sodium bicarbonate, the particular apparatus consisting essentially of a standpipe 11 for establishing and maintaining suitable pressure conditions in the absorbing system, a number of vertical reaction tubes 12 of small internal diameter and free from ridges or iregularities on which solid sodium bicarbonate could settle, and a thickener or settling tank for separating the sodium bicarbonate suspension into a thickened pulp and a supernatant mother liquor solution. A novel process and apparatus for recovering ammonia from the ammonium chloride mother liquor is also provided, this apparatus comprising one or more autoclaves 3 in which the ammonium chloride is reacted with limestone or other types of calcium carbonate for the production of calcium chloride solution and the liberation of ammonia and carbon dioxide gases. Preferably this autoclave is combined with a preliminary concentrator wherein the ammonium chloride mother liquor is given a preliminary concentration by direct contact with the products of combustion of a carbonaceous fuel, the stack gases being cooled by heat exchange with the incoming ammonium chloride solution and then scrubbed with aqueous sodium chloride solution to recover their carbon dioxide content. It will be evident, of course, that alkaline earth metal carbonates other than calcium carbonate could be used in this reaction, as for example by employing dolomitic limestone in the process.

It will be understood that the invention in its broader aspects is not limited to the particular apparatus and process illustrated on the drawing, but that modifications and substitutions of equivalents may be resorted to within the scope of the appended claims.

The operation of the process will be further illustrated by the following examples to which, however, the invention is not limited.

*Example 1*

Sodium chloride is dissolved in water in the tank 63 in proportions such as to make a solution containing about 245 grams of sodium chloride per liter. This solution is treated with a small amount of calcium hydroxide in suspension which is just enough to precipitate sulfates and other impurities in the salt. The treated solution is filtered and is then pumped through line 64 to the top of the scrubbing column 62. Equilibrium temperatures of about 253°–30° C. are preferably maintained at the top of this column and therefore a substantial part of the carbon dioxide in the flue gases from the furnace 4 is recovered in the salt solution leaving through line 67. The solution from this preliminary carbonating step is stored in head tank 10 and fed through standpipe 11 into the vertical reaction tubes 12.

Quantities of ammonia and carbon dioxide gases substantially equivalent to those required by the equation:

$$NaCl+NH_3+CO_2+H_2O=NaHCO_3+NH_4Cl$$

are injected through the diffusers 15 into the solution in the reaction tubes. It will be understood that the sodium chloride solution may be given a preliminary ammoniation if desired, and in this case only the carbon dioxide need be introduced in the diffusers 15. In either case, however, hydrostatic pressures on the order of 20–25 lbs. per square inch gage are maintained on the solution by the head of liquid in the standpipe 11, and therefore an efficient carbonation of the brine solution is obtained. Temperature conditions are not critical in the carbonation reaction, and the reaction tubes 12 are usually operated at ordinary atmospheric temperatures.

In the thickener 2 the sodium bicarbonate crystals which have formed in the salt solution as it rises in the saturator tubes 12 are separated as a thickened pulp which is withdrawn through line 25 as an underflow. The slurry so obtained is filtered and washed on the vacuum filter 28 and the filter cake is removed and dried in a suitable drier to give crude sodium bicarbonate or it is fed into a calciner to convert it into sodium carbonate. In the latter case the pure carbon dioxide gas from the calciner is collected, stored and pumped into the secondary diffuser 23 located in the horizontal section of the liquid inlet pipe to the thickening tank 2 in order to increase the yield of sodium bicarbonate crystals obtained.

The mother liquor from the thickener 2 is collected in tank 32 and passes through the heat exchanger 54 to the concentrator 5. In this vessel it is preferably concentrated to a point where its ammonium chloride content is approximately 460 grams per liter, the temperature of the concentrated solution being at about 100° C. At this concentration and temperature the ammonium chloride solution is charged into the autoclave 3. An amount of limestone ground to pass through a 200 mesh screen is provided that is slightly in excess of that necessary to react with all of the ammonium chloride, and the temperature inside the autoclave is raised to about 240°–250° C. and held for approximately one hour or until the reaction is complete. During this period the pressure inside the autoclave is preferably regulated to between 600–700 lbs. per square inch gage by periodically or continuously releasing the vapors and gases through the line 41. The autoclave pressure is then reduced and the calcium chloride solution is discharged through line 40.

If desired the hot gases and vapors in the line 41 may be passed in indirect heat exchange with mother liquor from the tank 32 or they may be sent directly to the receiving tank 43. In either case the resulting condensate is preferably introduced into line 68 for return to the solution tank 63. The ammonia and carbon dioxide gases from the receiver 43 are passed into the gas holder 45, as has been described.

*Example 2*

Instead of concentrating the mother liquor from the tank 32 it may be charged directly into the autoclave 3 for the limestone reaction. In this case the concentrator 5 and the flue gas scrubber 62 are not needed and the heat energy required to evaporate the water is saved, but the volumetric capacity of the autoclaves must be increased to accommodate the entire mother liquor and a more dilute calcium chloride solution is produced in these autoclaves. The increase in autoclave capacity is approximately 115% over that necessary when the conditions of Example 1 are used and therefore the saving in fuel and in concentrator equipment is largely offset by the larger expenditure in autoclaves. Thus, when the conditions of Example 1 are used, a plant producing 100 tons of soda ash per day will have five autoclaves measuring 39½ inches inside diameter by 18 feet and 8 inches long, made of 0.38% carbon steel and having a wall thickness of 1⅛ inches. If the mother liquor is not concentrated the number of autoclaves of the same dimensions will have to be eleven for the same plant capacity.

Since the carbon dioxide occurring in the present process is at a precise quantitative balance with respect to materials used, an extra amount of carbon dioxide is desired to compensate for mechanical losses, such as leakages. In Example 1, such extra carbon dioxide is derived from the flue gas of the concentrator 5. In Example 2 the required extra carbon dioxide may be derived from a flue gas to be found elsewhere.

*Example 3*

The production obtainable by the process and apparatus of the invention is evident from the following figures. To make one metric ton of sodium carbonate 932 kilograms of salt (96% NaCl) is dissolved in water to make 3645 liters of solution. After purification with milk of lime it is saturated with ammonia gas and carbon dioxide gas. The minimum amounts of these gases are 254 kilograms and 630 kilograms, respectively, and usually a larger amount is provided to make up for losses in the process. The ammonia which is put into the process at the start of the operation is not spent but is recovered after each cycle and is reused; ammonia losses due to leakage and other mechanical faults must of course be replaced with fresh stock. The carbon dioxide comes from the calcium carbonate during the autoclave treatment and may be augmented by the carbon dioxide in the flue gases if desired.

The mother liquor from tank 32 is preferably concentrated to an ammonium chloride content of 460 grams per liter, and after this concentration its volume is approximately 1364 liters. This solution is charged into the autoclave together with 660 kilograms of pulverized limestone containing 90% $CaCO_3$. The sodium bicarbonate obtained on the vacuum filter 28 is 1000 kilograms on a dry basis; when calcined, it is converted into 632 kilograms of soda ash.

What I claim is:

1. A process for the production of sodium bicarbonate which comprises reacting ammonia and carbon dioxide with aqueous sodium chloride solution in a sodium bicarbonate forming step and thereby forming a suspension of solid sodium bicarbonate in an aqueous solution of ammonium chloride, separating the solid sodium bicarbonate from said suspension, mixing the aqueous ammonium chloride solution with calcium carbonate and heating the mixture under pressure at temperatures above about 230° C. and thereby forming a calcium chloride solution and liberating carbon dioxide and ammonia, and returning the ammonia and carbon dioxide to the sodium bicarbonate forming step.

2. A process for the production of sodium bicarbonate which comprises reacting ammonia and carbon dioxide with aqueous sodium chloride in a sodium bicarbonate forming step and thereby forming a suspension of solid sodium bicarbonate in an aqueous solution of ammonium chloride, separating the solid sodium bicarbonate from said suspension, concentrating the ammonium chloride solution by evaporating water therefrom, mixing the concentrated ammonium chloride solution with calcium carbonate and heating the mixture at temperatures above about 230° C. and thereby forming a calcium chloride solution and liberating carbon dioxide and ammonia to the sodium bicarbonate forming step.

3. A process for the production of sodium bicarbonate which comprises contacting an aqueous sodium chloride solution with carbon dioxide gases in a preliminary carbonating step, reacting ammonia and additional carbon dioxide with the resulting solution in a sodium bicarbonate forming step and thereby forming a suspension of solid sodium bicarbonate in an aqueous solution of ammonium chloride, separating the solid sodium bicarbonate from said suspension, generating carbon dioxide gases by burning carbonaceous fuel and transferring heat derived from said burning of carbonaceous fuel to the ammonium chloride solution and thereby cooling said gases and concentrating said solution, passing the cooled carbon dioxide gases to said preliminary carbonating step, mixing the concentrated ammonium chloride solution with calcium carbonate and heating the mixture under pressure at temperatures above about 230° C. and thereby forming a calcium chloride solution and liberating carbon dioxide and ammonia, and passing the carbon dioxide and ammonia so liberated to the sodium bicarbonate forming step.

4. A method for the production of sodium bicarbonate which comprises passing a stream of aqueous sodium chloride solution downwardly through a standpipe and then upwardly through a plurality of relatively narrow, smooth reaction tubes having a height at least equal to the height of said standpipe, introducing carbon dioxide and ammonia into the moving solution in the lower portions of said reaction tubes and reacting said sodium chloride therewith under the hydrostatic pressure head of said standpipe and thereby forming a moving suspension of solid sodium bicarbonate, discharging said suspension from the upper ends of said tubes into a settling tank, and settling the solid sodium bicarbonate therefrom.

5. A method for the production of sodium bicarbonate which comprises passing a stream of aqueous sodium chloride solution downwardly through a standpipe and then upwardly through a plurality of narrow, smooth reaction tubes having a height at least equal to the height of said standpipe, introducing carbon dioxide and ammonia into the moving solution in the lower portions of said reaction tubes and reacting sodium chloride therewith under the hydrostatic pressure of said standpipe and thereby forming a moving suspension of solid sodium bicarbonate in an aqueous ammonium chloride solution, thickening said suspension and thereby separating it into a sodium bicarbonate pulp and a supernatant clarified ammonium chloride solution, decanting said ammonium chloride solution and liberating ammonia therefrom for reuse in the process, and drawing off and filtering said sodium bicarbonate pulp.

6. Apparatus for the production of sodium bicarbonate comprising in combination a standpipe, a plurality of relatively narrow and internally smooth vertical reaction tubes having a height at least equal to the height of said standpipe, means connecting the base of said standpipe with the lower ends of said tubes, means for passing aqueous sodium chloride solution downwardly through said standpipe and upwardly through said tubes, and means for introducing carbon dioxide and ammonia into the moving solution in the lower portions of said reaction tubes.

7. Apparatus for the production of sodium bicarbonate comprising in combination a standpipe, a plurality of internally smooth vertical reaction tubes having their lower ends in communication with the base of said standpipe, a thickener, means for passing aqueous sodium chloride solution downwardly through said standpipe and upwardly through said tubes, means for introducing carbon dioxide and ammonia into said solution in the lower portions of said tubes, means for discharging sodium bicarbonate suspension from said tubes into said thickener, and means for recovering solid sodium bicarbonate from the underflow from said thickener.

8. Apparatus for the production of sodium bicarbonate comprising in combination a standpipe, a plurality of relatively narrow and internally smooth vertical reaction tubes having a height at least equal to the height of said standpipe, means connecting the base of said standpipe with the lower ends of said tubes, a thickener, means for passing aqueous sodium chloride solution downwardly through said standpipe and upwardly through said reaction tubes, means for introducing carbon dioxide and ammonia into said solution in the lower portions of said tubes, means for discharging sodium bicarbonate suspension from said tubes into said thickener, means for recovering solid sodium bicarbonate from the underflow from said thickener, an autoclave, means for introducing supernatant solution from said thickener into said autoclave, means for introducing calcium carbonate into said autoclave, means for heating said autoclave, and means for passing carbon dioxide and ammonia from said autoclave to said reaction tubes.

9. Apparatus for the production of sodium bicarbonate comprising in combination a preliminary carbonating tower and means for passing an aqueous sodium chloride solution downwardly therethrough, a standpipe, a plurality of relatively narrow and internally smooth vertical reaction tubes having a height at least equal to the height of said standpipe, means connecting the base of said standpipe with the lower ends of said tubes, a thickener, means for passing the sodium chloride solution from the base of said preliminary carbonating tower into the top of said standpipe and downwardly therethrough and upwardly through said reaction tubes, means for introducing carbon dioxide and ammonia into said solution in the lower portions of said tubes, means for discharging sodium bicarbonate suspension from said tubes into said thickener, means for recovering solid sodium bicarbonate from the underflow from said thickener, a furnace having an autoclave set in an upper portion thereof and a concentrating section in the lower portion, means for burning carbonaceous fuel and discharging the products of combustion into said furnace, means for passing supernatant solution from said thickener into said concentrating section, means for passing solution from said concentrating section into said autoclave, means for introducing calcium carbonate into said autoclave, means for passing ammonia and carbon dioxide from said autoclave to said preliminary carbonating tower, and means for passing the products of combustion from said furnace into the base of said preliminary carbonating tower.

10. Apparatus for production of sodium carbonate comprising in combination a reactor for reacting ammonia and carbon dioxide with an aqueous sodium chloride solution, comprising a standpipe and a relatively narrow internally smooth vertical reaction tube, a separator for removing solid sodium bicarbonate from the resulting suspension, means to deliver said solution from the reactor to the separator, means for concentrating the solution from said separator, an autoclave and means for introducing a resulting concentrated solution thereinto, means for introducing calcium carbonate into said autoclave, and means for passing ammonia and carbon dioxide from said autoclave to said reactor.

References Cited in the file of this patent

UNITED STATES PATENTS

| | | |
|---|---|---|
| 361,355 | Frasch | Apr. 19, 1887 |
| 409,382 | Barnum | Aug. 20, 1889 |

OTHER REFERENCES

Jacobson: Encyclopedia of Chemical Reactions, volume II, Reinhold Publishing Corp., New York, 1948, page 57.

UNITED STATES PATENT OFFICE

CERTIFICATE OF CORRECTION

Patent No. 2,866,681                                December 30, 1958

Lichi Pan

It is hereby certified that error appears in the printed specification of the above numbered patent requiring correction and that the said Letters Patent should read as corrected below.

Column 5, line 41, for "253°-30° C." read -- 25°-30° C. --.

Signed and sealed this 7th day of April 1959.

(SEAL)
Attest:
KARL H. AXLINE
Attesting Officer

ROBERT C. WATSON
Commissioner of Patents